United States Patent [19]
Snook

[11] 3,778,710
[45] Dec. 11, 1973

[54] RANGING AMPLIFIER SYSTEMS
[75] Inventor: Richard K. Snook, Bridgeton, Mo.
[73] Assignee: Diginetics Incorporated, Bridgeton, Mo.
[22] Filed: Oct. 20, 1971
[21] Appl. No.: 190,808

[52] U.S. Cl. ............... 324/123 R, 324/130, 324/131, 330/9
[51] Int. Cl. ............................ G01r 1/30, G01r 1/02
[58] Field of Search .................... 324/123, 130, 131, 324/115; 330/9

[56] References Cited
UNITED STATES PATENTS

| | | | |
|---|---|---|---|
| 2,497,961 | 2/1950 | Shaw | 324/123 |
| 2,981,107 | 4/1961 | Anderson | 324/131 |
| 3,383,594 | 5/1968 | Fiorletta et al. | 324/131 |
| 3,405,359 | 10/1968 | Gilman et al. | 324/131 |
| 3,559,041 | 1/1971 | Trigg | 324/131 |
| 3,105,230 | 9/1963 | MacIntyre | 330/9 |
| 3,532,980 | 10/1970 | Tucker | 324/130 |
| 3,148,366 | 9/1964 | Schulz | 324/130 |
| 3,242,489 | 9/1966 | Leyde | 324/130 |
| 3,509,460 | 4/1970 | Mizrahi | 324/130 |

Primary Examiner—Rudolph V. Rolinec
Assistant Examiner—Ernest F. Karlsen
Attorney—Robert J. Schaap et al.

[57] ABSTRACT

An auto ranging amplifier with automatic zero suppression which automatically adds a D.C. potential to an amplified input signal to keep a data trace within preestablished channel boundaries. A special circuit integrates the data potential and compares the resultant average with the limits of these preestablished channel boundaries. If the average of the data potential traverses either set point of these preestablished limits, steps of zero suppression are introduced, thus returning the data to the center of the preestablished channel. The equivalent amount of offset is available as an analog step voltage and as a binary number, such as four bits plus sign, in either parallel or serial format. This serial format is directly compatible with a recorder input while the parallel data may be displayed on a lamp bank for continuous evaluation of zero suppression magnitude. An embodiment of the invention which tracks and suppresses electrical hum or noise is also disclosed.

23 Claims, 6 Drawing Figures

INVENTOR
RICHARD K. SNOOK
BY
Robert J. Schaap
ATTORNEY

RANGING AMPLIFIER SYSTEMS

BACKGROUND OF THE INVENTION

This invention relates in general to certain new and useful improvements in ranging amplifier systems, and more particularly, to ranging amplifier systems with automatic zero suppression for automatically adding a D.C. potential to an amplified input signal, to thereby maintain the input signal within preestablished channel boundaries.

With the recent advent of electronically sophisticated measuring equipment, the need for automatic zero suppression in instrumentation measuring devices has become more apparent. For example, in the measuring of biological potentials, such as electrooculograph recording, it is almost imperative to employ an operator who will monitor the measurement or recording and continually adjust the zero control in order to prevent the trace signal from creeping toward channel boundaries. Most of the commercially available instrumentation equipment is only capable of operating within preestablished boundaries and does not provide means for maintaining a signal within these preestablished boundary limits. Accordingly, the operator is always required to monitor the signal and continually provide zero adjustment.

There have been several prior art attempts to obviate this problem, but these attempts to date, have not been particularly effective. One of the prior art systems devised, relies upon the use of multiple transducers and associated instrumentation amplifiers. In an attempt to arrive at the same effective dynamic range as that achieved in the instant invention, a low gain amplifier and a high gain amplifier were employed. The low gain amplifier was designed to monitor base line information and the high gain amplifier, which was A.C. coupled to the same signal source was designed to monitor the low amplitude dynamic component of the instrumentation signal. However, certain problems were introduced with this system. These two inputs would normally have a source loading due to reflected impedance. Time correlation between the two input signals presented a problem in the recording of data and in the analysis thereof. Furthermore, the use of A.C. coupled amplifiers to record small components caused a distortion of the components due to the response of the amplifier which was limited at the low frequency end.

Another of the prior art attempts to obviate this problem relied upon the employment of an alternating gain switching amplifier. When the component signal exceeded a threshold value for a preselected period of time, the gain of the switching amplifer was instantaneously reduced. However, problems of data reduction were inherently introduced with these switching amplifier systems. Transient signals were generated at the gain switch point and these signals were quite difficult to remove inasmuch as the signal often looked like the low amplitude data signal. If the switching amplifier was operating at less than maximum gain, resolution of the system was limited by reduction of the maximum gain. Therefore, the maximum signal, plus noise to noise ratio was degraded during switching and the time when the gain was less than the maximum gain.

It is, therefore, the primary object of the present invention to provide a ranging amplifier with automatic zero suppression which will always maintain a signal within preestablished channel boundaries.

It is another object of the present invention to provide a ranging amplifier of the type stated, which permits the recording of information having a base line value and a dynamic component from a single source.

It is a further object of the present invention to provide a ranging amplifier of the type stated which permits the recording of a base line value signal and a low amplitude signal without destroying the resolution of the low amplitude signal, thus enhancing the system dynamic range.

It is also an object of the present invention to provide a ranging amplifier which tracks and suppresses electrical noise or hum.

It is an additional object of the present invention to provide a ranging amplifier of the type stated which is durable in its construction, highly efficient in its operation and relatively economical to manufacture.

It is yet another object of the present invention to provide a method of automatically adding a D.C. potential to an amplified input signal in order to maintain the input signal within preestablished channel boundaries.

With the above and other objects in view, my invention resides in the novel features of form, construction, arrangement and combination of parts presently described and pointed out in the claims.

GENERAL DESCRIPTION

The auto ranging amplifier system of the present invention constitutes a complete, compact system designed to provide the resolution of a high gain D.C. amplifier without the attendant signal loss due to base line shift. In conventional amplifier systems, signal loss is usually encountered where a small dynamic component is to be measured when such component is riding on a slowly varying base level. The amplifier systems of the present invention completely obviate this signal loss problem. Two embodiments of the amplifier system are disclosed herein. The first of these amplifier systems is designed to provide zero suppression to keep a data trace within preestablished channel boundaries. The second of these amplifier systems is designed to track and suppress electrical noise such as hum.

The system of the present invention is highly effective in maintaining an electrical signal from an external source within a pair of channel boundaries. The channel boundaries are generally established by the maximum limits of information capacity in a particular system. Accordingly, the present invention establishes a pair of threshold levels which are included within the limits of the preestablished channel boundaries. These threshold levels have been arbitrarily established as the limits of maximum shift of a base line value or so-called "base level" of the signal in such manner that the dynamic component does not exceed the channel boundary. Generally, a reference level may be established between the threshold level as the desired base level of a signal.

The auto ranging amplifier system of the present invention is highly effective with electrical signals from external sources which have a base line value established by a slowly varying D.C. component and the slowly varying D.C. component generally may carry a more rapidly varying A.C. and/or D.C. component which is generally referred to as the dynamic component.

The ranging amplifier system of the present invention operates in such a manner that it will suppress the base line value of the slowly varying D.C. component of the electrical signal to a reference level which has been established between the threshold levels. Furthermore, while suppressing the base line value of the slowly varying D.C. component, the ranging amplifier system of the present invention will also amplify the dynamic component of this signal, which is generally the component of interest.

In general terms, the zero suppression amplifier system may be considered to comprise the following eleven major elements which are:

1. A high gain D.C. input amplifier with a high impedance differential input and single ended output, a nominal gain of approximately 40 dbv over a selectable band from D.C. to a maximum of at least 10 Khz, a common mode rejection ratio at least 65 db, the input impedance of the amplifier preferably being at least 2 megohms;

2. An operational amplifier which provides a base line offset function to retain the resolution of the input amplifier while summing this signal with a D.C. signal, and thereby prevent bottoming out or latch-up of the output signal when large base line shifts are present at the input terminals;

3. Two threshold detectors generally in the form of analog comparators which detect a base line shift greater than a preset valve, e.g. a base line shift of greater than 0.001V, reference being made to the input signal for a minimum average time such as one second;

4. A pulse generator and gate assembly to generate an increment or decrement pulse under control of the threshold detectors;

5. A digital-to-analog convertor including a bi-directional counter to accept the serial pulses generated by the pulse generators and provide parallel binary equivalent signals to an analog-digital ladder network forming part of the convertor, and to an output control system (hereinafter described);

6. A polarity determination circuit including feedback amplifiers for providing an offset level to the summing node of the operational amplifier and which offset level will counteract any base line shift of the input signal;

7. A driving circuit for driving certain gates in the counter gate assembly;

8. A polarity memory latch for retaining the state of polarity of the offset level to the summing node;

9. A shift register to accept the parallel binary signals or data from the bi-directional counter which defines the amount of base line correction being added to the data in the operational amplifier at any instant in time;

10. An output control system in the form of an oscillator and divider having a plurality of flip-flops to periodically transfer the binary contents of the shift register to the output;

11. A binary output conditioner to provide one of two selectable output formats, so that the data may be obtained in F.M. format for direct recording on magnetic tape or in level shift format for use in graphic recorders.

The second embodiment of the auto ranging amplifier is substantially similar to the previously described amplifier system but with additional circuitry provided to reduce or remove the hum or other selected narrow band noise component from the output signal. In general terms, the hum suppression circuitry may be considered to comprise the following elements:

1. An output sampling network to monitor the magnitude of the undesired signal component;

2. A rectifier and filter to provide an electrical measure of average power of the undesired signal over some selected time period;

3. An amplifier to provide a control signal based upon the above derived average;

4. A tunable filter of the general type referred to as a "bridge-T" which can be adjusted in frequency in response to an input signal; and 5. Suitable feedback elements to null out the undesired signal in the amplifier.

FIGURES

In the accompanying drawings (three sheets).

DETAILED DESCRIPTION

Figures 1, 5:
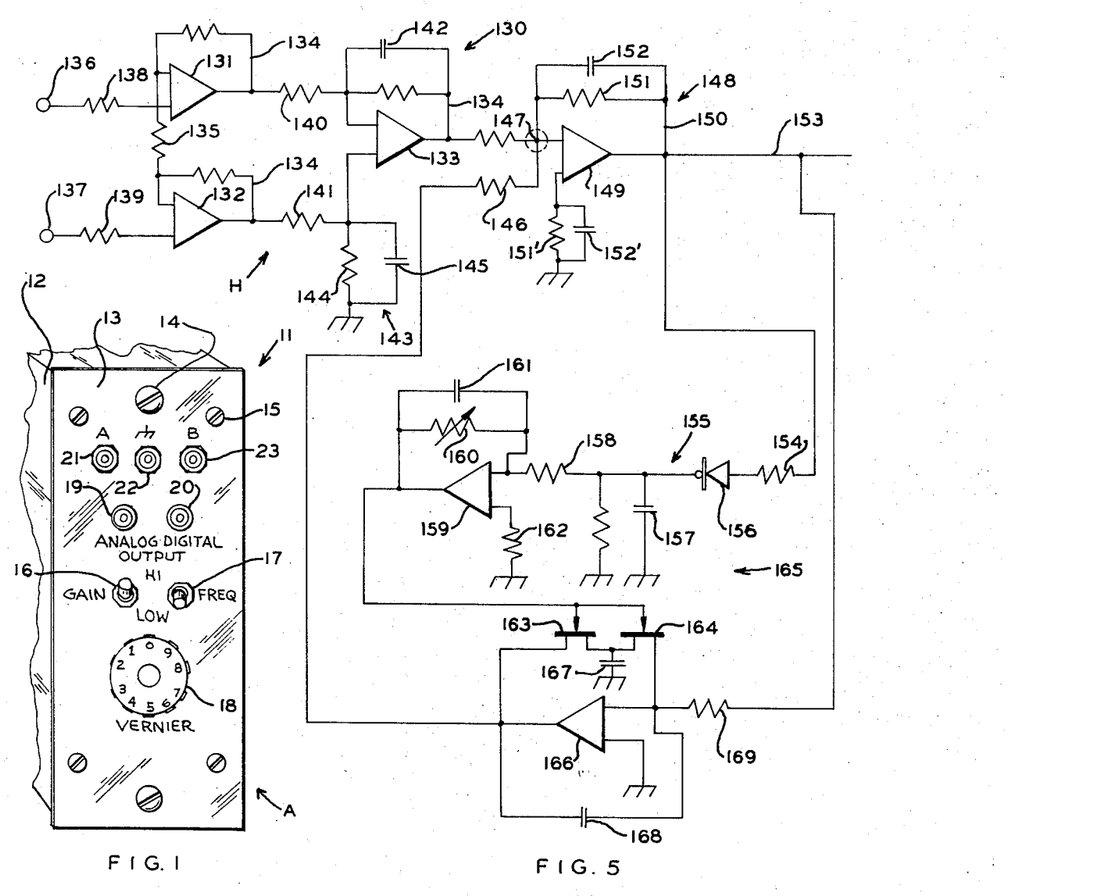
FIG. 1 is a perspective view partially broken away of a ranging amplifier system constructed in accordance with and embodying the present invention.
FIG. 5 is a schematic view of a modified form of ranging amplifier system of the present invention which is capable of tracking and suppressing electrical noise.

Referring now in more detail and by reference characters to the drawings which illustrate practical embodiments of the present invention, A designates an auto ranging amplifier system which is constructed in accordance with and embodies the present invention, the housing portion of which is more fully illustrated in FIG. 1.

Figure 2:
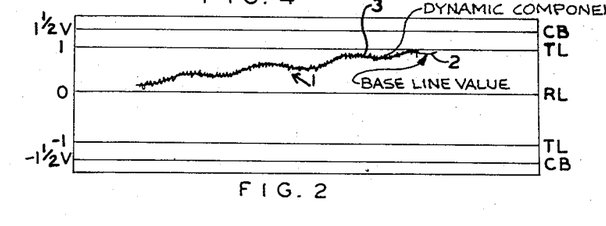
FIG. 2 is a diagramatic view of a plot showing the establishment of various boundary levels in accordance with the present invention and a signal trace with respect to these boundary levels.

In order to more fully understand the operation and construction of the ranging amplifier system of the present invention, reference is made to FIG. 2 which illustrates a diagramatic view of a plot showing the establishment of various boundary levels and a signal trace with respect to these boundary levels. It can be seen that the signal which is designated as 1 has a slowly varying D.C. component 2 which establishes a base line value of the signal and the slowly varying D.C. component 2 will generally carry a dynamic component 3. It can be observed that the dynamic component varies much more rapidly in terms of frequency than does the slowly varying component and the dynamic component will generally be a high frequency A.C. signal or a high rate of change D.C. signal or a combination thereof.

By further reference to FIG. 2, it can be seen that the signal 1 will operate within a pair of channel boundaries designated as C.B., which essentially define the maximum limitations of informational capacity of the system. Thus, the channel boundaries C.B. could represent the upper and lower margins of a chart on a strip chart recorder, for example. In like manner, the channel boundaries could represent the maximum display limitations of an EKG recorder or the like.

The amplifier system of the present invention is provided with means for generating a pair of threshold levels designated as T.L. in FIG. 2 and which will always be maintained within the channel boundaries C.B. The threshold levels have been established in such manner that if the dynamic component of the signal tends to traverse either of these threshold levels, the shift of the base line value of the signal will be suppressed. A reference level which is generally, though not necessarily, a zero voltage level, has been established between the two threshold levels and this reference level has been designated as R.L. The reference level is generally midway between the two threshold levels though it can be established at a level which is closer to one of the threshold levels than the other one of these threshold levels.

The amplifier system of the present invention is highly effective in reducing the base line value 2 of the signal 1 generally to the reference level R.L. and amplifying the dynamic component 3. As indicated previously, at any point in time where the dynamic component begins to traverse either of the threshold levels T.L. a base line offset is introduced to shift the base line value 2 of the signal 1 towards the reference level R.L. It should be observed that the terms "slowly varying component" and "rapidly varying dynamic component" refer to the frequency of the signal in a domain of time. It is difficult to ascribe any limits to these terms inasmuch as the time constants with regard to the variance of these signals will differ in different applications. For example, in examining the transients on a power supply, the output drift of the supply may vary by milivolts in many hours whereas the dynamic component will vary in miliseconds. On the other hand, when examining a structural surface subjected to stresses, the base line value may vary in miliseconds depending on the stresses, but the vibration which constitutes the dynamic component will vary in a much more rapid manner. Accordingly, the slowly varying signal which is generally the D.C. signal will vary at a substantially slower rate than the dynamic component which is carried thereby.

Referring again to FIG. 1, the amplifier system A generally comprises a plug-in box housing 11 constructed of a proper size to be mounted within conventional electronic racks, and is provided with opposed removable side panels 12 and a front control panel 13. The control panel 13 is provided with mounting screws 14 for securement to a conventional rack mounting panel. Furthermore, the control panel 13 is removably secured to the housing 12 by means of small cap screws 15.

It can be seen that the control panel is provided with a three-position gain control switch 16 and a three-position frequency control switch 17 which can be switched between a "high", "medium" and a "low" position in order to maintain any mode of gain or frequency as desired. The panel is also provided with a rotary switch 18 or so-called "vernier" which provides for offset selection. Again referring to FIG. 1, it can be seen that the front panel 13 is provided with a shielded output connector 19 which is sized to receive a conventional cable connector and rendering an analog output signal. The output at the connector is essentially the primary output signal of interest from the amplifier system A of the present invention. In like manner, the front panel 13 is provided with a shielded connector 20 rendering a digital output signal and which is sized to receive a similar output connector. Finally, the control panel 13 is provided with three input jacks 21, 22 and 23 designated as "A" "GROUND" and "B".

Figure 3A:
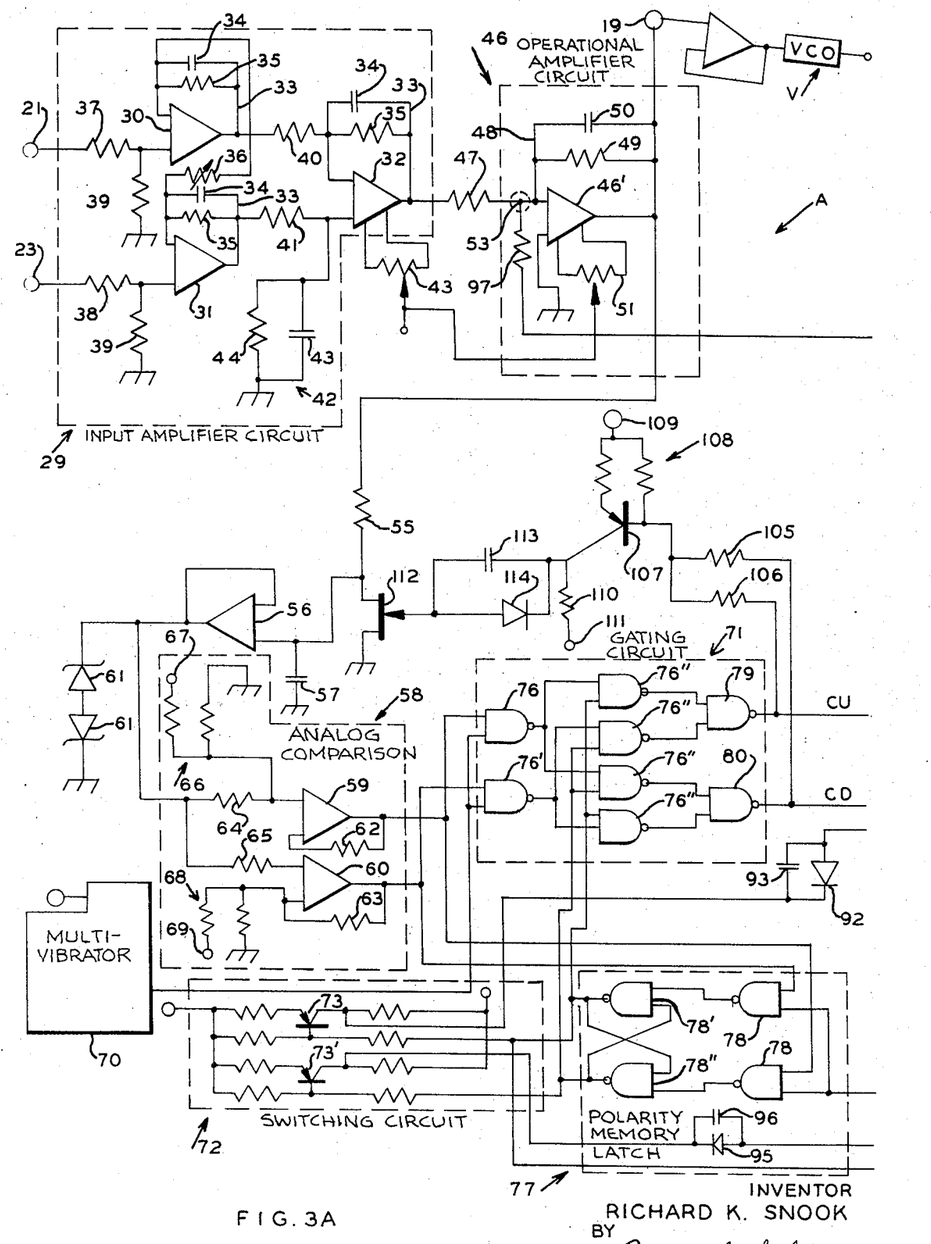
FIGS. 3a and 3b are a composite schematic view of an electrical circuit which forms part of the amplifier of the present invention.
Figure 3B:
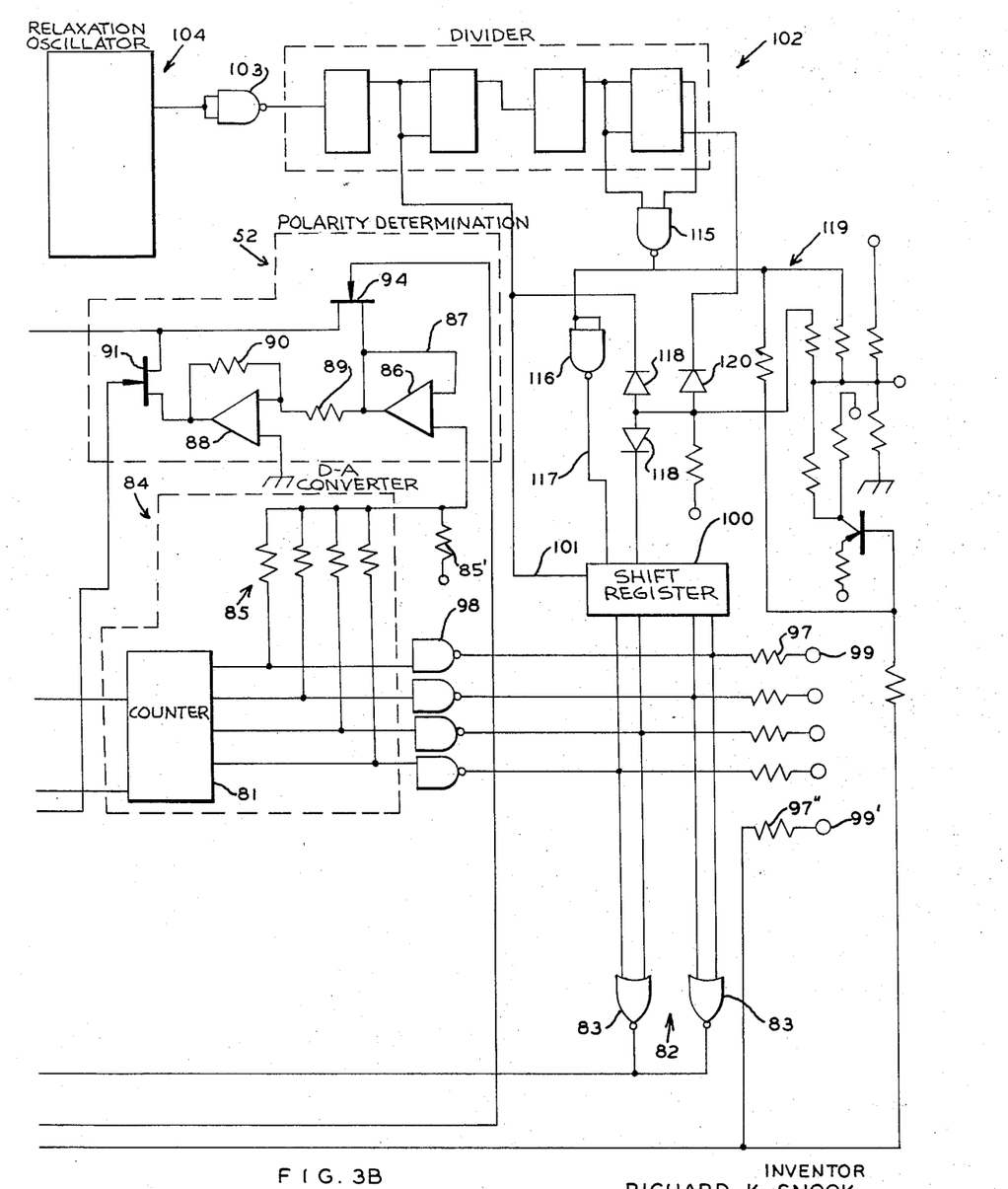

Referring now to the composite FIGS. 3a and 3b which illustrate the electrical circuit forming part of the amplifier system A, it can be seen that the amplifier system A comprises an input amplifier circuit 29 including three integrated circuit operational amplifiers 30, 31 and 32. Each of the amplifiers 30, 31 and 32 have similar resistive-capacitive feedback circuits 33 and each of the feedback circuits 33 include capacitors 34 and resistors 35. The outputs of each of these amplifiers 30 and 31 are connected to the respective feedback circuits 33 associated with these amplifiers and these outputs also form one of the inputs to the amplifier 32 in the manner as illustrated in FIG. 3a. In addition, the output of the amplifier 32 is connected to the feedback circuit 33 associated with this amplifier 32. Furthermore, the feedback circuit 33 for the amplifier 31 is connected through a coupling resistor 36 to the feedback circuit 33 associated with the amplifier 30. The value of this coupling resistor 36 determines the input stage gain and is switch selected by the gain control switch 16. The amplifiers 30 and 31 are each provided with inputs connected to the input connectors 21 and 23 through connecting resistors 37 and 38. Furthermore, the common point of connection between the resistors 37 and 38 and the respective amplifiers 30 and 31 are grounded through resistors 39.

The output of the amplifier 30 is connected through a coupling resistor 40 to the inverting input of the amplifier 32 and the output of the amplifier 31 is connected through a coupling resistor 41 to the non-inverting input of the amplifier 32. The inverting input of the amplifier 32 also receives the feedback circuit 33 associated with this amplifier 32. The common point of connection of the coupling resistor 41 and the non-inverting input to the amplifier 32 is provided with a grounded R.C. circuit 42 which includes a capacitor 43 and a resistor 44 connected in parallel, similar to the feedback loop 33, in the manner as illustrated in FIG. 3a.

The input amplifier circuit 29 which includes the three operational amplifiers 30 through 32 and their associated components are constructed so as to present a highly desirable extremely high impedance to the input terminals 21 and 23. Further, it is desirable to maintain a closely matching gain, drift and offset for each of the operational input amplifiers 30 and 31 which is accomplished by matching the pairs of components in the feedback circuits 33, namely, the capacitors 34 and the resistors 35, as well as by matching the various input and coupling resistors 37, 38 and 39. These amplifiers 30 and 31, therefore, constitute a dual operational amplifier unit which has been selected for matching drift and D.C. offset. The use of this dual operational amplifier unit aids in providing drift-free operation, due to the fact that the thermal environments, chip characteristics, and the like, are nearly identical. Therefore, in construction of the input amplifier circuit 29, care must be exercised in selecting the components forming a part thereof to assure adequate matching and thereby prevent degradation of system performance. The voltage gains of the operational amplifiers 30 and 31, which serve as a preamplifier, are set by the relative values of the feedback networks 33 across the amplifiers 30 and 31 and adding a numerical value of one, two or 10, depending upon the selection of the resistor operable by the gain control switch 16.

The high frequency response of each of the amplifiers 30–32 is controlled by selection of the various rolloff capacitors 34 in the feedback circuits 33. Again, the pairs of capacitors 34 for the feedback circuits 33 across the amplifiers 30 and 31 and the capacitors 34 and 35 in the feedback circuit 33 across the amplifier 32, as well as the capacitor 43 in the input to the amplifier 32, must be matched closely to preserve common mode rejection and signal-to-noise ratio performance.

The differential amplifier 32 as well as the associated components provides a common mode rejection for the system and a voltage gain of approximately 10. The amplifier 32 is also provided with an offset potentiometer 45 to compensate for D.C. offset due to any imperfection in matching and to obviate the effects of any other type of internal imperfection.

The outputs of the input amplifier circuit 29 are connected to an operational amplifier circuit 46 which may also be referred to as "a summing amplifier circuit" and which includes an operational amplifier 46'. The operational amplifier 46' receives an input from the operational amplifier 32 through a connecting resistor 47 and the other input of the amplifier 46' is grounded. The amplifier 46' is also provided with a resistive-capacitive feedback circuit 48 comprising a resistor 49 and a capacitor 50 connected in the manner as illustrated in FIG. 3a. Thus, it can be seen that the feedback circuit 48 of the amplifier 46' and the input to the amplifier 46' from the amplifier 32 serve as the common connections to the inverting input to the amplifier 46' and form a summing node 53. The output terminal 19 which is connected to the output of the amplifier 46' provides the primary signal of interest as indicated above. The amplifier 46' is similarly provided with an offset potentiometer 51 to compensate for D.C. offset in the same manner that the potentiometer 45 compensates for offset in the amplifier 32.

A polarity determination circuit 52 provides a polarity signal which is introduced into the amplifier 46' at the summing node 53. The amplifier 46' also presents an output which may be terminated at the shielded output connector 19 providing an analog output signal for external use. An offset control circuit (not shown) can be connected to the summing node 53 and the potentiometric control 18, if desired.

The output of this amplifier 46' is also introduced through a coupling resistor 55 into a buffering amplifier 56 where a portion of this output signal is impedance buffered. Base line level integration of this impedance buffered output signal takes place within an integrating capacitor 57 which is interposed between the coupling resistor 55 and the amplifier 56. The charge in the capacitor 57 is a measure of average base line level and as the signal peaks exceeds the preestablished threshold level, the charge in the capacitor 57 increases. Therefore, the output voltage of the amplifier 56 will increase as it derives its input signal from the capacitor 57 and the coupling resistor 55. A voltage controlled oscillator V is also connected to the operational amplifier 46' for generating an F.M. output.

The output of the buffering amplifier 56 is received in an analog comparison circuit 58, and more specifically at the negative and positive inputs respectively, of a positive analog comparator 59 and a negative analog comparator 60. The analog comparators 59 and 60 also have inputs connected to a pair of oppositely connected Zener diodes 61 which serve to protect the comparators 59 and 60 from high input levels, transients and the like. Resistors 62 and 63 are connected across the comparators 59 and 60 respectively, and some positive feedback through the resistors 63 and 62 is provided to increase the hysteresis and thus render the comparators 59 and 60 less sensitive to noise and transients.

By further reference to FIG. 3a, it can be seen that the output of the amplifier 56 is connected to the analog comparators 59 and 60 through input resistors 64 and 65, respectively. Connected to the common connection of the resistor 64 and the one input to the analog comparator 59 through a voltage dividing resistive network 66 is a positive 12-volt power supply terminal 67 which is operatively connected to a positive 12-volt power supply (not shown). Also connected to the common connection of the input and the feedback 63 across the analog comparator 60, through a voltage dividing resistive network 68 is a minus 12-volt power supply terminal 69. In like manner, the terminal 69 is operatively connected to a negative 12-volt power supply (not shown). These voltage dividing resistive networks 66 and 68 provide the reference signals for the comparators 59 and 60.

The analog comparison circuit 58 generates outputs which assume one of two discrete levels and these discrete levels are a function of the relative level at each of the input terminals to the analog comparators 59 and 60. Thus, in the case of the analog comparator 59, for example, a voltage is supplied to one terminal thereof from the voltage dividing network 66. The value of the resistors in this network 66, together with the potential of the input to the analog comparator 59, will in effect, determine the voltage at the output terminal of the comparator 59. The same input-output relationship for the comparator 59 also holds true for the analog comparator 63. The output levels of the comparators 59 and 60 will shift from a point near a ground potential to a positive potential of approximately 4 volts depending on the level of the inputs with respect to the reference inputs. Thus, it can be seen that a positive output from the analog comparator 59 indicates a positive base line shift over an integration time of greater than the threshold value and conversely, a positive output level from the analog comparator 60 indicates a negative base line shift.

The amplifiers 30 and 31 are connected to form a difference amplifier, although a true differential amplifier could be employed by removal of the resistors 39. The type of amplifier connection employed for the amplifiers 30 and 31 will in large measure depend upon the end use of this system. For example, when the amplifier system of the present invention is used in medical applications, large physical separation between the input leads may exist, and accordingly, difference amplifiers would be more effective. The operational amplifier 46' is characterized by high input impedance and low output impedance with extermely high gain. It can be observed that since a portion of the output of the amplifier 46' is coupled back to the input as degenerative feedback, the gain of the amplifier is theoretically established by the ratio of the resistance in the feedback loop 33 to the resistance in the amplifier input, namely the resistor 47. The signal which occurs at the summing node 53 is essentially opposed by the current from the output of the amplifier 46' through the feedback loop 48. Further, it can be observed that if the output current of the amplifier 46' changes as a result of a change in the input current, this differential current is detected at the summing node 53. Due to the gain of the amplifier 46', there will be a change in the current through the resistor 49 which will be equal in magnitude and opposite in sign to the change of input current to the amplifier 46', thereby holding the summing node 53 at a virtual ground potential.

A conventional A-stable multivibrator 70 has one input connected to a counter control gating circuit 71 and also provides a clock signal to the digital circuitry to be hereinafter described. The A-stable multivibrator is designed to provide a pulse train at a multiple of the rate of the highest analog signal frequency used in the output of the operational amplifier circuit 46, and preferably at a rate of approximately five and one half times the highest analog signal frequency. The multivibrator 70 essentially includes a pair of forwardly biased transistors, and a cross-coupled capacitive circuit and resistance circuit. The actual construction of the multivibrator 70 is conventional and is, therefore, neither illustrated nor described in any further detail herein.

A switching circuit 72 includes a pair of transistors 73 and 73' connected as conventional voltage amplifiers which provide signals responsive to the state of a polarity latch (to be hereinafter described) to select the polarity of the zero suppression signal from the polarity determination circuit (to be hereinafter described). The switching circuit 72 can be considered to function as an "analog gate driver amplifier".

The outputs of the analog comparators 59 and 60 in the analog comparison circuit 58 are connected to the counter control gating circuit 71 which is comprised of a pair of input NAND gates 76 and 76' connected in the manner as illustrated in FIG. 3a. The input NAND gates 76 and 76' are connected to four intermediate NAND gates 76''.

Also connected to the counter control gate circuit 71 is a polarity memory latch 77 which is comprised of two NAND gates 78 and two cross-coupled NAND gates 78' and 78'', all connected in the manner as illustrated in FIG. 3a. It can be seen that the two NAND gates 78' and 78'' are cross-coupled in order to render a "count-up" level and a "count-down" level and the outputs of these two NAND gates 78' and 78'' serve as inputs to intermediate NAND gates 76'' in the counter control gating circuit 71 in the manner as illustrated in FIG. 3a.

The counter control gating circuit 71 also includes two output NAND gates 79 and 80, which are connected to the intermediate NAND gates 76'', the gate 79 providing an output in the form of "increment" pulses and the gate 80 providing an output in the form of "decrement" pulses. The increment output from the gate 79 actually constitutes an "ADD" signal and the decrement output from the gate 80 actually constitutes a "SUBTRACT" signal. These two output signals are connected to a T²L integrated circuit bi-directional counter 81 which has a "count-up" input designated as "CU" and a "count-down" input designated as "CD". The count-up input receives the increment output of the NAND gate 79 and the count-down input receives the decrement output of the NAND gate 80.

When the threshold level is reached, one of the two NAND gates 79, 80 will be conditioned to provide a path for a clock pulse from the multivibrator 70. This combination of the threshold signal and this clock pulse generates an increment or decrement in the binary counter 81. In order to prevent the count from changing to a complement form, if the base line shifts through the zero level, the counter control gating circuit 71 and the polarity memory latch 77 in conjunction with the other circuitry described herein, will invert the control logic at the counter 81 at the point where a count of zero is granted.

If it is assumed that the base line signal is at some level which will cause a positive output with respect to ground and that this condition has existed for some period of time, the sign of the base line offset will be positive and the "up" output of the cross-coupled NAND gate matrix in the latch 77 will be rendered true. If the level average increases in a positive direction, the threshold level in the analog comparison circuit 58 and the clock signal from the multivibrator 70 will cooperate to provide an output at the NAND gate 80 which will, in turn, cause the counter 81 to increment. If the base line signal thereafter shifts below the negative threshold level, the negative analog comparator 60 will enable a decrement pulse to be transmitted to the counter 81 through the NAND gate 79. If this subtraction or decrement from the stored count in the binary counter 81 produces a total of zero, this condition will be sensed by a zero detection circuit 82 composed of a pair of NOR gates 83 connected to form a four-input NOR gate function, in the manner as illustrated in FIG. 3 b. This zero condition, together with the output of the analog comparator 60 will cause the polarity latch 77 to change output state. The next negative threshold signal will be transmitted to the count-up input of the counter 81 through the NAND gate 79 and which will produce an increment pulse to the counter 81. In this manner, the output of the cross-coupled NAND gates 78', 78'' in the polarity memory latch 77 will provide the sign of the stored count in the counter 81 and thereby effectively reverse the action of the inputs to the counter 81 so that no compliment form outputs are generated.

The binary counter 81 forms part of a digital-to-analog converter 84 which also includes a digital-to-analog ladder network 85 and this ladder network 85 is connected to four outputs of the binary counter 81. A bias resistor 85' is connected across the output of the network 85. The output amplifiers of the T²L integrated circuit counter 81, often referred to as a so-called "totum-pole", are a low source impedance circuit which permits the digital-to-analog conversion to be made in the ladder network which comprises a simple 2R–4R–8R ladder circuit. A conventional "switch" and R–2R resistor network would be a practical circuit to perform this function if a greater count capacity were desired. In essence, a current summing is achieved through this ladder network 85.

The current summing output of the ladder network 85 is introduced into the non-inverting input of an amplifier 86 which forms part of the polarity determination circuit 52 and which amplifier 86 has a unity gain due to an infinite feedback 87 serving as one of the inputs to the amplifier 86. The output of the amplifier 86 is connected to a unity gain, inverting configured amplifier 88 through a resistor 89. A resistor 90 is connected across the amplifier 88. The output of the amplifier 88 is directed to the source of a field effect transistor 91 which is driven at the gate from the switching circuit 72, in the manner as illustrated in FIG. 3b. It is to be noted that a diode 92 and a capacitor 93 are interposed in parallel relationship in the connection between the gate of the transistor 91 and the switching circuit 72. The drain output of this transistor is connected to the summing node 53, via a current limiting resistor 97, also in the manner as illustrated in FIG. 3b.

The amplifier 86 is similarly connected through a field effect transistor 94 to the summing node 53. The gate of the transistor 94 is again driven through the switching circuit 72 and the line connecting the gate of the transistor 94 and the switching circuit 72 is provided with a diode 95 and a capacitor 96 connected in parallel in the manner as illustrated in FIG. 3b. Thus, the field effect transistors 91 and 94 perform an analog switch function similar to the action of a double throw switch.

Referring again to the cross-coupled NAND gates 78' and 78'' in the polarity memory latch 77, it can be observed that the up and down signals which indicate the sign of the number in the counter 81 are used to determine the polarity of the step voltage which is applied at the summing node 53 of the operational amplifier circuit 54. This step voltage is derived from either the output of the amplifier 86 or the amplifier 88 in the polarity determination circuit 52 depending on the state of the polarity memory latch 77.

If one of the NAND gates 78' in the cross-coupled NAND gate portion of the polarity memory latch 77 is rendered true, then the transistor 73 will be biased into conduction and the transistor 73' will be turned off. Conversely, if the other NAND gate 78'' in this cross-coupled NAND gate portion of the memory latch 77 is biased into conduction, the transistor 73' will be biased into conduction. As this occurs, the gate of the field effect transistor 91 will change from a negative voltage to some other more positive value. At this point in time, the field effect transistor 91 will act as a switch to connect the output of the amplifier 88 to the summing node 53 through the resistor 97. In like manner, when the opposite NAND gate 78' in the latch of the cross-coupled NAND gate portion of the memory latch 77 is energized, then the transistor 94 will be biased into conduction.

The current which is introduced at the summing node 53 from the output of the polarity determination circuit 52 and hence, from the digital-to-analog converter 84 is a fraction of the output of the operational amplifier circuit 46 generally in the area of one-tenth of the output of the amplifier circuit 46, and, therefore, about one hundred times the input value.

The multivibrator 70 generates a signal which permits the gating of a pulse from the multivibrator 70 to the counter 81 and adds or subtracts a binary "one" from the number stored in the counter 81. It should be observed that the analog ladder 85 will include a number of resistors equivalent to the number of bits in a data word and since a four-bit system is characterized herein, the digital-to-analog ladder 85 includes only four resistors. In like manner, if a seven-bit system were employed, the ladder 85 would contain seven resistor steps. The output of the counter 81 contains several output lines in the manner illustrated in FIG. 3b and contains parallel binary information which is equivalent to the input base line value multiplied by the amplification of the input amplifier 19 and divided by the threshold value of this amplifier 19. For example, if a 5 milivolt input signal is employed and the limit detector is +1.0 volts, then in order to have stabilization, it will be necessary to have a −5.0 milivolt signal at the summing node 53 in order to generate a zero base line value. In essence, it is necessary to generate a voltage signal equal in magnitude and opposite in sign to the base line value at the summing node 53 and apply this voltage signal to the summing node 53 in order to cancel the base line offset value which would appear at the summing node 53. In essence, this cancellation of the base line offset is accomplished through the digital-to-analog ladder network 85 previously described.

It can be seen that the four output signals in the counter 81 are connected through resistors 97' and gates 98 to output plugs 99 which may be optionally mounted on the panel 13 for ultimate connection to a display device such as a lamp bank, or the like (not shown). An additional output plug 99' is connected through a resistor 97'' to the output of the polarity memory latch 77 for indicating the state thereof and hence the sign of the output to such display device. This type of display device would be used for the continuous monitoring of the zero suppression sign and the magnitude thereof.

The outputs from the gates 98 are also connected to a shift register 100 which has a shift bus output 101 connected to a divider circuit 102. The divider circuit 102 also receives an input signal through a gate 103 from a relaxation oscillator 104. The divider circuit employed herein generally contains about four serially connected flip-flops though there are a number of available dividing circuits which can be used in the present invention. The relaxation oscillator 104 is also well known in the art and generally contains a unijunction transistorized network with a resistive base-1 and base-2 and a resistor capacitor circuit connected to the emitter of the transistor.

Connected to the outputs of the count-up and count-down lines from the gates 79 and 80 in the counter control gating circuit 71 through isolating resistors 105 and 106 respectively, is a transistor 107. The base and emitter of the transistor 107 are connected across a voltage dividing network 108 to a positive voltage terminal 109. The collector of the transistor 107 is connected through a resistor 110 to a negative voltage terminal 111, and the collector is also connected to the gate of another field effect transistor 112 through a capacitor 113 and a diode 114. It can be observed that the output of the transistor 112 is, in turn, connected to the amplifier 56 in the manner as illustrated in FIG. 3a. This circuitry serves to discharge the integrating capacitor 57 subsequent to an incremental or decremental base line shift by providing a low impedance path to ground thus preventing the time constant of the integrator 55–57 from generating spurious counts by holding the comparators 59 and 60 operated after a count pulse has been rendered.

The divider 102 contains two flip-flops having outputs connected to an AND gate 115 and which, in turn, has an output connected to another AND gate 116. The output of the AND gate 116 serves as an enter bus 117 which is connected to the shift register 100. By further reference to FIG. 3b, it can be seen that the shift register 100 has a control output connected through a pair of diodes 118 to the shift bus 101. The diodes 118 form part of a converter output circuit 119 for optional connection to a chart recorder (not shown). It can be seen that the common connection of the diodes 118 is connected through another diode 120 into the last named flip-flop in the divider circuit 102. In like manner, this output is connected to a voltage summing network and a transistor switch in the manner as illustrated in FIG. 3b. The chart recorder would be connected to the illustrated output plug and it should be observed that this output plug could be conveniently located on the control panel 13.

In operation, the amplifier system of the present invention will receive an external signal at the terminals 21 and 23 and this signal is amplified at the input amplifier 29. Furthermore, the operational amplifier circuit 46 which essentially serves as a summing amplifier circuit establishes the summing node 53 and a D.C. offset signal is incrementally introduced at the summing node 53 and is designed to suppress the base line value shifts of the slowly varying D.C. component. This D.C. offset signal which is introduced at the summing node 53 will generally be equal in magnitude, but opposite in sign to the slowly varying D.C. component of the input signal.

The signal at the output of the operational amplifier 46' is integrated in the integrating network comprising the resistor 55 and the capacitor 57 and the integration of this signal provides a measure of the base line value rate. The average of this base line value rate is essentially the relative magnitude of the two components, namely, the slowly varying component and the dynamic component forming a part of this signal. The buffering amplifier 56 essentially prevents a discharge of the capacitor 57 into the analog comparators 59 and 60 for reasons which will presently more fully appear. The charge in the capacitor 57 constitutes the average of the base line value and the transistor 112 functions as a switch to periodically discharge this capacitor 57 after any base line shift. For this purpose, the resistor 55 generally has a high value resistance level since the output of the amplifier 46' is merely being sampled at this point and the capacitor 57 is chosen for the time constant value.

The multivibrator 70 supplies a pulse train so that when the analog comparators 59 and 60 are actuated, that is, when the input potential exceeds the reference level which has been established, the output of these comparators 59 and 60 will essentially switch from a zero voltage state to about 4 volts. Furthermore, these comparators 59 and 60, in combination, will determine if this voltage was more negative or less negative with respect to the reference level or ground. When the amplified input signal tends to traverse the preestablished threshold levels the outputs of the comparators 59 and 60 will be introduced into the gates 76 and 76' and these outputs will be combined with the clocking output of the multivibrator 70. In this connection, it should be observed that the multivibrator 70 generates a square-wave clock pulse output.

When the combined signals of the comparators 59 or 60 and the clocking signal from the multivibrator 70 is introduced at either of the gates 76 ar 76', either a decrement or an increment pulse will be generated thereby subtracting or adding a count of 1 in the counter 81. This will accordingly generate a current change in the digital-analog converter 84 and particularly in the ladder network 85 thereof. Consequently, a potential change will occur in this ladder network 85. It can be observed that the output of the ladder network will be introduced into the amplifier 86 and also the amplifier 88 so that the output signal may be introduced at the summing node 53, either through the transistor 91 or the transistor 94. Accordingly, the transistors 91 and 94 in combination serve as a single-pole double-throw switch. The amplifier 86 is an inverting amplifier and the amplifier 88 is a non-inverting amplifier each having unity gain so that the signal which is introduced at the summing node will be equal in magnitude to the slowly varying component of the input signal but opposite in sign with respect thereto. Furthermore, it can be observed that at the time that the signal is generated for introduction into the summing node 59, the capacitor 57 has discharged thereby deenergizing the analog comparators 59 and 60.

It can also be observed that during the generation of the signal to the summing node 53, the count-up signal or the count-down signal energized the transistor 107 which, in turn, initiated the energization of the transistor 112, thereby permitting discharge of the capacitor 57. Furthermore, it should be observed that the capacitor 57 is discharged prior to the next pulse in the pulse train from the multivibrator 70 and in this manner, the states of the comparators 59 and 60 are not upset with respect to the generation of the signal to the summing node 53.

The polarity memory latch 77 in combination with the polarity determination circuit 52 is a highly effective means for preventing the counter 81 from counting in complements. Typically, the prior art resorted to the employment of a plurality of counters, or relied upon counters with means for carry-over. The polarity determination circuit 52 in combination with the memory latch 77 completely obviates the need of this expensive circuitry. When the counter 81 counts a pulse at the output of the gates 79 or 80, either an add or subtract condition is generated. However, if the counter is at a zero state, subtraction of an additional pulse would otherwise generate an erroneous output signal.

The four input NOR gate circuit 82 which comprises the gates 83 receives the outputs of the counter 81 in the manner as illustrated in FIG. 3b. If there is no logical one output, then the gates 83 will generate a "naught" output so that on the next pulse from the multivibrator 70, a subtract pulse will be generated at the output of the comparator 60 and transmitted to the cross-coupled NAND gates 78' and 78'' in the polarity memory latch 77. The polarity memory latch 77 will effectively reverse the outputs of the comparators 59 and 60 with respect to the count-up and count-down lines into the counter 81. Accordingly, if a minus one or subtract pulse is generated and the counter 81 is at a zero state, the cross-coupled NAND gates 78' and 78'', and hence the gates 79 and 80 will effectively reverse so that a positive 1 count is generated in the counter 81. Furthermore, either the transistor 91 or the transistor 94 will be energized in order to obtain the proper sign of this count. Thus, it can be observed that the counter 81 merely counts the magnitude of the signal and the transistors 91 and 94 in combination will generate the proper sign of this signal. The switching circuit 72 essentially functions as a level shifting network to operate the transistors 91 and 94.

The relaxation oscillator 104 in combination with the divider 102 enable the generation of the serial output presentation such as to a chart recorder. The output terminals 99 will provide the magnitude of the signals and the output terminals 99' will provide the sign of the output signals.

Thus, it can be seen that the ranging amplifier system of the present invention actually serves as a true direct current amplifier in that when the base line moves beyond the preestablished threshold values the signal switches and moves the base line incrementally. Furthermore, due to the presence of the digital circuitry and the digital output, the operator can conveniently keep track of the base line shifts. The various devices of the prior art continuously averaged the base line signal and generate a feedback into the summing node so that these prior art amplifiers did not constitute a true direct current amplifier. Accordingly, it can be seen that the amplifier system of the present invention constitutes a significant advance over these prior art amplifiers. An actual output on a chart recorder from the amplifier system of the present invention is illustrated in FIG. 5.

It should be observed that the zero suppression amplifier system of the present invention can find employment in a wide variety of measurement and control activities and could be used with a strain gauge in the manner as previously described. The amplifier system of the present invention is highly effective in instrumentation applications in that the amplifier enables the gain of a signal to be maintained at a sufficiently high level for examination thereof.

Thus, for example, the subject amplifier system can be used with strain gauges in the measurement of various vibration conditions in the presence of severe bending stresses to maintain the high frequency signal within a preselected range. The amplifier system of the present invention is also highly effective in biomedical electronic apparatus for the use in measuring muscle potentials and the like. When the amplifier system is used to provide electromyograph signals, these signals are superimposed on a skin potential signal of much greater magnitude and slowly varying D.C. value.

The amplifier system of the present invention is also highly effective in enabling the recording of signals which are normally too large for conventional recorders. For example, if one was to record transient noise on the output of a D.C. power supply, the zero suppression amplifier of the present invention would enable the recording of this noise signal with respect to a base line value. The amplifier system of the present invention also finds effective employment as an electrical noise or hum suppression amplifier, in a manner to be hereinafter described in more detail.

Referring now to FIG. 5, H represents a ranging amplifier system which is capable of tracking and suppressing electrical noise such as A.C. hum or the like. The amplifier system H would also be conventionally mounted in a plug-in box housing similar to the housing 11 and which is also constructed of a proper size to be mounted within a conventional electronic rack. Furthermore, the housing would be suitably provided with a front control panel having suitable control members for operating the amplifier system H.

The amplifier H generally comprises an input amplifier circuit 130, which includes three integrated circuits, operational amplifiers 131, 132 and 133. Each of the amplifiers 131, 132 and 133 have similar resistive feedback circuits 134 across the inputs and outputs of each of the amplifiers 131 and 132 and are connected through a resistor 134 in the manner as illustrated in FIG. 5. Furthermore, the non-inverting inputs of the amplifiers 131 and 132 are provided with input terminals 136 and 137 through connecting resistors 138 and 139, respectively.

Figure 4:
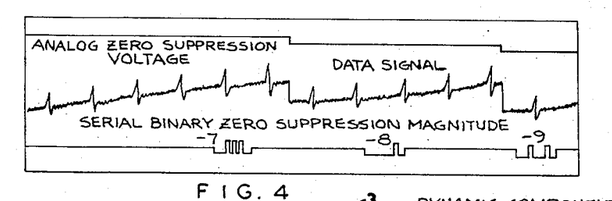
FIG. 4 is a schematic view of a representative data signal trace and a recorded binary magnitude output which is produced by the amplifier of the present invention.

The outputs of the amplifiers 131 and 132 are connected, respectively, through coupling resistors 140 and 141 to the inverting and non-inverting inputs, respectively, of the operational amplifier 133. In addition, a capacitor 142 is connected in parallel with the resistive feedback circuit 134 across the amplifier 113, in the manner as illustrated in FIG. 4.

The input amplifier circuit 130 which includes the three operational amplifiers 131, 132 and 133 and their associated components are constructed to present extremely high impedance to the input terminals 136 and 137. The selection of this type of input system provides the desirable high input impedance. Further, the various components associated with each of the operational amplifiers 131, 132 and 133 are closely matched with regard to gain, drift and offset and in this manner the amplifiers 131 and 132 provide a dual operational amplifier unit which has been selected for matching drift and D.C. offset.

The output of the amplifier 132 is also connected through the resistor 141 to a resistor-capacitor circuit 143 comprising a grounding resistor 144 and a capacitor 145 connected in parallel therewith. The output of the amplifier 133 is connected through a resistor 146 to the summing node 147 of a summing amplifier circuit 148 including an operational amplifier 149. The operational amplifier 149 also has the inverting input thereof connected to the summing node 147 and the non-inverting input thereof grounded through a resistor 151' and a capacitor 152' connected in parallel. In addition, the operational amplifier 149 is provided with a resistive-capacitive feedback circuit 150 having a resistor 151 and a capacitor 152. It should be observed that the amplifier 149 could present an output which may be terminated in the form of a conductor 153 for external use. It should also be noted that the capacitors 142, 145 and 152 and 152' are selected so as to provide common roll-off characteristics.

The output of the amplifier 149 is also connected through a resistor 154 to a rectifier 155 comprising a diode 156 and a grounded filter capacitor 157. This rectifier 155 is then connected through a coupling resistor 158 to an amplifier 159 which provides a control signal based upon an electrical measure of average power of the undesired signal. The rectifier 155 provides this electrical measure of average power of the undesired electrical hum signal over some selected time period. Connected across the amplifier 159 is a variable resistor 160 and connected in parallel with the resistor 160 is a roll-off capacitor 161, in the manner as illustrated in FIG. 5. The non-inverting input of the amplifier 159 is also grounded through a resistor 162.

The output of the amplifier 159 is connected to the gates of dual J-field effect transistors 163 and 164 which form part of a bridge-T filter 165. The drains of the transistors 163 and 164 are connected to an output and to an input, respectively, of an amplifier 166 in the manner as illustrated in FIG. 5. The other input to the amplifier 166 is grounded, and in like manner, the sources of the field effect transistors 163 and 164 are grounded through a capacitor 167. A capacitor 168 is connected across the amplifier 166 in feedback relationship thereto and is also connected to the drains of the field effect transistors 164 and 165, as illustrated in FIG. 5. The bridge-T filter 165 receives an input from the output of the amplifier 149 through a resistor 169 and the output of the amplifier is connected through a coupling resistor 169 to the summing node 147.

The amplifier H is capable of automatically tracking and nulling out the hum component in an external electrical signal. These dual field effect transistors 163 and 164 form a type of resistance in the bridge-T filter 165 to tune the signal which is rectified, integrated and received from the output of the amplifier 159. This signal drives the gates of the field effect transistors 163 and 164 to provide a tracking at the center frequency of the filter. Thus, it can be observed that in a plot of voltage gain vs. a change in frequency, a large peak would be achieved at one selected frequency. The circuit H of the present invention essentially generates a signal which is the obverse or mirror image of the undesired signal and nulls out this particular frequency.

The circuit H also operates within a predefined band or pair of set points which are essentially created by the hysteresis in the circuit components. The levels of these set points or bands which establish the operating channel of the circuit are determined by component selection in the circuit. Thus, it can be observed that the amplifier H operates in a manner very similar to the amplifier A.

It will be apparent to those skilled in the art, however, that many changes, modifications, variations and other uses and applications of the present invention are possible and all such changes, modifications, variations and other uses and applications which do not depart from the spirit and scope of the invention are deemed to be covered by the invention, which is limited only by the claims which follow.

Having thus described my invention, what I desire to claim and secure by Letters Patent is:

1. A ranging amplifier system providing automatic suppression of an external signal with respect to a preestablished reference level, said system comprising input amplifier means to receive an external signal having a slowly varying D.C. component establishing a base line value and a more rapidly varying dynamic component, and where said more rapidly varying component is a higher frequency A.C. signal, a high rate of change D.C. signal, or a combination thereof, means for creating a pair of preestablished threshold levels within a pair of channel boundaries, integrating means operatively associated with said input amplifier means for receiving the external signal and integrating the relative magnitudes of the base line value and the dynamic component of the external signal to generate an effective average of the signal, analog comparison means for comparing the average of the signal to the pair of preestablished threshold levels and determining if the average thereof tends to traverse said preestablished threshold levels, offset means cooperatively associated with said comparison means for adding a D.C. offset signal to the average of said slowly varying component to shift the base line value toward said reference level, if said average thereof tends to traverse said preestablished threshold levels to thereby maintain the external signal within said preestablished threshold levels, a summing node operatively interposed between said input amplifier means and said integrating means to receive a D.C. offset signal and add said D. C. offset signal to the average of the slowly varying component at said summing node, and said input amplifier means being adapted and arranged for amplifying the dynamic component of said signal with respect to the slowly varying component, whereby the system will suppress the base line value of the slowly varying D. C. component with respect to said preestablished reference level and simultaneously amplify the dynamic component of said external signal.

2. The ranging amplifier system of claim 1 further characterized in that the offset signal is a zero suppression signal.

3. The ranging amplifier system of claim 1 further characterized in that means is provided in said ranging amplifier system to render a digital output signal representing said added offset signal.

4. The ranging amplifier system of claim 1 further characterized in that parallel storage means is operatively associated with said ranging amplifier system to enable generation of a parallel binary output.

5. The ranging amplifier system of claim 1 further characterized in that parallel storage means is operatively associated with said ranging amplifier system to enable generation of a parallel binary output.

6. The ranging amplifier system of claim 1 further characterized in that parallel storage means is operatively associated with said ranging amplifier system to enable generation of a parallel binary output, and converter means is operatively connected to said storage means to enable generation of a serial binary output.

7. The ranging amplifier system of claim 1 further characterized in that output means is provided for rendering an output of a zero suppression voltage with respect to the base level and the sign thereof.

8. The ranging amplifier system of claim 1 further characterized in that filter means is provided to track said electrical signal and filter electrical nose contained therein.

9. The method of maintaining an electrical signal having a slowly varying D. C. component establishing a base line value and a more rapidly varying dynamic component within a pair of preestablished threshold levels and simultaneously amplifying the dynamic component, said method comprising introducing into an initial input amplification environment a signal having a slowly varying D. C. component and a more rapidly varying dynamic component, and where said more rapidly varying dynamic component is a higher frequency A. C. signal, a high rate of change D. C. signal, or a combination thereof, creating said pair of threshold levels and a reference level therebetween, integrating the relative magnitudes of both the base line value and more rapidly varying dynamic component of said electrical signal to obtain an effective average of said signal over a predetermined time period, comparing the effective average of the signal to the pair of threshold levels, determining if the average of said electrical signal approaches traversal of either of said pair of preestablished limits, establishing a summing node between the input amplification environment and the point of integrating the relative magnitudes, introducing a D. C. offset signal at the established summing node to the average of said electrical signal tending to periodically shift said base line value with respect to said reference level, maintaining said electrical signal within said preestablished threshold levels, rendering an output of said electrical signal within said preestablished threshold levels, and amplifying the dynamic component of the signal with respect to the slowly varying component thereof, whereby the base line value of the slowly varying D. C. component is suppressed with respect to the preestablished reference level and the dynamic component of the external signal is simultaneously amplified.

10. The method of claim 9 further characterized in that the method comprises visually displaying in digital format the electrical signal with the introduced offset signal.

11. The method of claim 9 further charcterized in that the method comprises the providing of a binary output and a serial output.

12. A ranging amplifier system capable of providing automatic suppression of an external signal having a slowly varying D. C. component establishing a base line value and a more rapidly varying dynamic component with respect to a preestablished reference level and simultaneously amplifying the dynamic component, and where said more rapidly varying component is a higher frequency A. C. signal, a high rateof change D. C. signal, or a combination thereof; said ranging amplifier system comprising input amplifier means to receive the external signal, operational amplifier means operatively connected to said input amplifier means to retain resolution established by said input amplifier means, means for creating a pair of preestablished threshold levels within a pair of channel boundaries, integrating means operatively associated with said operational amplifier means for integrating the relative magnitudes of the base line value and the dynamic component of the external signal to generate an effective average of the signal, analog comparison means for comparing the average of the signal to the pair of preestablished threshold levels and determining if the average thereof tends to traverse said preestablished threshold levels, offset means cooperatively associated with said comparison means for generating and adding a D. C. offset signal to the average of said slowly varying component to shift the base line value toward said reference level, if said average thereof tends to traverse said preestablished threshold levels to thereby maintain the external signal within said preestablished threshold levels, a summing node operatively interposed between said input amplifier means and said integrating means to receive the D. C. offset signal and add said D.C. offset signal to the average of the slowly varying component at said summing node, polarity determination means forming part of said offset means to provide an offset level to said summing node, and said input amplifier means being also adapted to amplify the dynamic component of said signal with respect to the slowly varying component.

13. The ranging amplifier system of claim 12 further characterized in that visual display means is provided to render a visual display of the signal with the introduced offset signal.

14. The ranging amplifier system of claim 12 further characterized in that parallel storage means is operatively associated with said ranging amplifier system to enable generation of a parallel binary output, and converter means is operatively connected to said storage means to enable generation of a serial binary output representing said added offset signal.

15. The ranging amplifier system of claim 12 further characterized in that output means is provided for rendering an output of a zero suppression voltage with respect to the base level and the sign thereof.

16. A ranging amplifier system capable of providing automatic suppression of an analog external signal having a slowly varying D.C. component establishing a base line value and a more rapidly varying dynamic component with respect to a preestablished reference level and simultaneously amplifying the dynamic component, and where said more rapidly varying component is a higher frequency A.C. signal, a high rate of change D.C. signal, or a combination thereof; said ranging amplifier system cmprising input means to receive said analog external signal, means for creating a pair of preestablished threshold levels within a pair of channel boundaries, integrating means operatively connected to said input means for integrating the relative magnitudes of the base line value and the dynamic component of the external signal to generate an effective average of the signal, analog comparison means for comparing the average of the signal to the pair of preestablished threshold levels and determining if the average thereof tends to traverse said preestablished threshold levels, offset means cooperatively associated with said comparison means for adding a D.C. offset signal to the average of said slowly varying component to shift the base line value toward said reference level, if said average thereof tends to traverse said preestablished threshold levels to thereby maintain the external signal within said preestablished threshold levels, means for amplifying the dynamic component of said signal with respect to the slowly varying component to provide an analog output of the external signal, parallel storage means also receiving the D.C. offset signal to enable generation of a parallel binary output, and converter means operatively connected to said parallel storage means to enable generation of a serial binary output representative of the D.C. offset signal, whereby said ranging amplifier system will suppress the base line value of the slowly varying D.C. component with respect to the preestablished reference level and simultaneously amplify the dynamic component of said external signal and simultaneously provide a binary output of any added D.C. offset signal.

17. The ranging amplifier system of claim 16 further characterized in that visual display means is also provided to render a visual display of the electrical signal with the introduced offset signal.

18. The ranging amplifier system of claim 16 further characterized in that a summing node is operatively interposed between the input means and the integrating means for summing the external signal with a D.C. offset signal to prevent a traversal of the electrical signal with respect to the preestablished threshold limits.

19. The ranging amplifier system of claim 16 further characterized in that said comparison means comprises a first threshold detector to determine if the electrical signal tends to traverse one of the preestablished threshold limits and a second threshold detector to determine if the electrical signal tends to traverse the other of the preestablished threshold limits.

20. The ranging amplifier system of claim 19 further characterized in that the threshold detectors are analog comparators.

21. The ranging amplifier system of claim 16 further characterized in that said comparison means comprises a first threshold detector to determine if the external signal tends to traverse one of the preestablished threshold limits and a second threshold detector to determine if the electrical signal tends to traverse the other of the preestablished threshold limits, pulse generation means operatively connected to said threshold detectors and controllable thereby to generate either an increment pulse or a decrement pulse to enable a shifting of the threshold limits with respect to the external signal.

22. The ranging amplifier system of claim 18 further characterized in that polarity determination means is operatively connected to said summing node and forms part of said offset means to provide an offset level to the summing node and thereby counteract any base line shift of the external signal.

23. The ranging amplifier system of claim 16 further characterized in that binary output conditioner means forms part of said system and is provided to condition the output thereof so that the output is available in a plurality of formats.

* * * * *